United States Patent

Harada et al.

[11] Patent Number: 6,110,072
[45] Date of Patent: Aug. 29, 2000

[54] OIL PUMP CONTROL DEVICE FOR AUTOMATIC TRANSMISSION

[75] Inventors: Chiaki Harada, Zama; Masaki Shimakura; Takashi Shibayama, both of Isehara, all of Japan

[73] Assignee: Nissan Motor Co., Ltd., Yokohama, Japan

[21] Appl. No.: 09/338,385

[22] Filed: Jun. 23, 1999

[30] Foreign Application Priority Data

Jun. 30, 1998 [JP] Japan .................... 10-184079

[51] Int. Cl.$^7$ ............................................ F16H 7/00
[52] U.S. Cl. ........................................ 477/157; 477/158
[58] Field of Search ................... 475/5; 318/280; 477/158, 157

[56] References Cited

U.S. PATENT DOCUMENTS

| | | | |
|---|---|---|---|
| 4,283,968 | 8/1981 | Kalns ........................... | 475/140 |
| 5,014,800 | 5/1991 | Kawamoto et al. ........... | 180/65.5 |
| 5,217,085 | 6/1993 | Barrie et al. .................. | 184/104.1 |
| 5,230,402 | 7/1993 | Clark et al. .................. | 180/307 |
| 5,290,153 | 3/1994 | Schmidt ........................ | 417/216 |
| 5,672,852 | 9/1997 | Chipperfield et al. ........ | 318/280 |
| 5,799,744 | 9/1998 | Yamaguchi et al. .......... | 180/65.2 |
| 5,944,632 | 8/1999 | Hara et al. ................... | 477/158 |

*Primary Examiner*—Khoi Q. Ta
*Attorney, Agent, or Firm*—Foley & Lardner

[57] ABSTRACT

A speed ratio control operation of an automatic transmission for a vehicle is controlled by using an oil pressure supplied from a oil pump (16). At least a circuit (22) which sets a rotation speed of the oil pump (16) to a first pump rotation speed in order to maintain a necessary minimum line pressure to control a variable mechanism, a stationary vehicle condition determination circuit (24) which determines that the vehicle is operating under the conditions that the brake is operated and vehicle speed is below a fixed value, and a circuit (23) which sets a second pump rotation speed which is lower than the first pump rotation speed when stationary vehicle conditions are met are provided. The rotation speed is lowered to the second pump rotation speed when the vehicle stationary conditions are met which results in reduced energy consumption and reduced noise pollution.

5 Claims, 4 Drawing Sheets

OIL PUMP CONTROL DEVICE FOR AUTOMATIC TRANSMISSION

FIELD OF THE INVENTION

The present invention relates to a device which controls the rotation of speed of an oil pump for an automatic transmission.

BACKGROUND TO THE INVENTION

A pressurized oil supplied from an oil pump is used to control the switching or lock-up of an automatic transmission in a vehicle. A rotation speed of the oil pump which is necessary to maintain an oil pressure (line pressure) to the minimum value is determined from the supply response characteristics of the oil pressure and the characteristics of the transmission. As a result, the rotation speed of the pump can not fall below a fixed rotation speed.

However when the vehicle is in a state in which the next speed ratio control step is not immediately performed, for example when the brake pedal is depressed bringing the vehicle to a halt, it may be the case that the required line pressure will fall below the minimum line pressure as discussed above. Thus even in this situation, the oil pump rotation speed is held above a fixed value in order to maintain the fixed minimum line pressure. However the maintenance of a minimum line pressure in the above situation is not effective from the point of view of energy consumption. Furthermore the problem of reducing pump operation noise has arisen.

SUMMARY OF THE INVENTION

The present invention is proposed to solve the above problem and has the object of reducing a rotation speed of an oil pump and reducing noise and energy consumption associated with driving the pump when a required line pressure by the transmission is low.

In order to achieve the above objects the present invention provides an oil pump control device for an automatic transmission controlled by a speed ratio control mechanism in response to an oil pressure, the oil pump control device comprises an oil pump supplying an oil pressure to an oil pressure control mechanism of the automatic transmission , and an oil pump controller controlling a rotation speed of the oil pump. The oil pump controller comprises a circuit setting a rotation speed of the oil pump to a first pump rotation speed to maintain at least a minimum required oil pressure to control the automatic transmission, a stationary vehicle determination circuit determining a condition that a vehicle is braking and a vehicle speed is below a fixed lower vehicle speed, a circuit determining a second pump rotation speed lower than the first pump rotation speed when the stationary vehicle condition is established, and a circuit controlling a pump rotation speed to equal the set pump rotation speeds.

The details as well as other features and advantages of the invention are set forth in the remainder of the specification and are shown in the accompanying drawings.

DESCRIPTION OF THE PREFERRED EMBODIMENTS

The present invention is adapted for use with a hybrid vehicle provided with an engine and an electrical motor.

Figure 1:
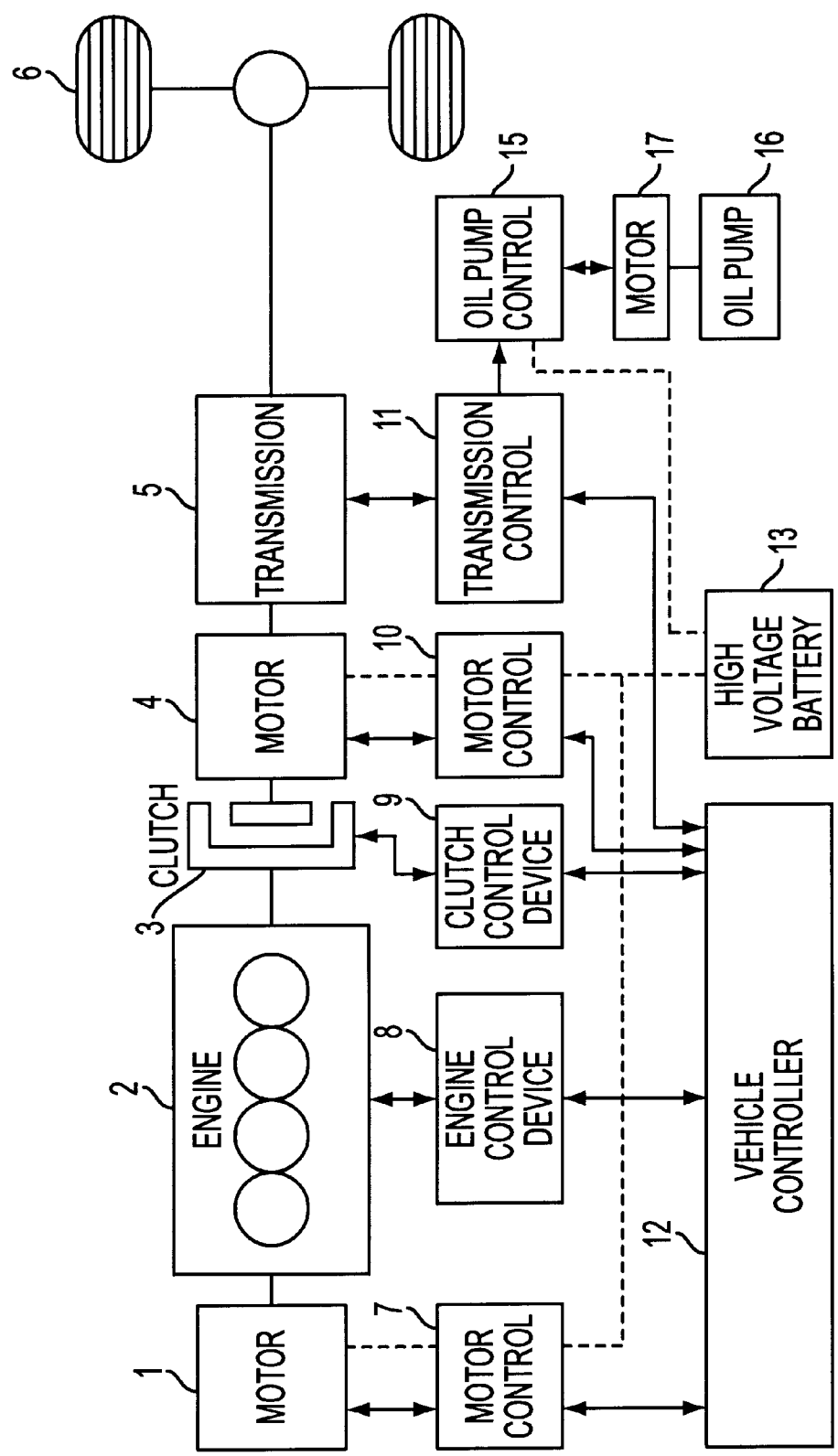
FIG. 1 is an overall block diagram of the present invention.

In FIG. 1, reference numeral 1 denotes an electrical rotating element for starting the engine and generating electricity, 2 is an engine which drives the electrical rotating element 1 when the element is used as a generator. The engine 2 generates a drive force when a high output is required. 3 is a clutch which connects and disconnects the engine 2 and an electrical rotating element 4 (to be explained below). 4 is an electrical rotating element (motor/generator) which generates a drive force for the vehicle by acting as a motor when a low load is required or during forward motion. The electrical rotating element 4 generates electricity by regeneration of the energy during braking and the like. 5 is an automatic transmission which varies output rotations of the engine 2 and electrical rotating element 4 and transmits the rotation to drive wheels 6.

The function of the electrical rotation element 1 as a motor or generator is controlled by the electrical rotation element control device 7. In the same way, the output of the engine 2 is controlled by the engine control device 8. The connection/disconnection of the clutch 3 is controlled by the clutch control device 9. The switching of the electrical rotation element 4 between the functions of motor or generator is controlled by the electrical rotation element control device 10. The drive ratio of the automatic transmission 5 is controlled by a transmission control device 11. The overall control of the above components is performed by the vehicle controller 12. 13 is a battery for the vehicle which can store generated electrical energy.

As a result of the above control, when the vehicle is making forward progress, the clutch 3 is disconnected at low speeds, the vehicle is driven by the electrical rotation element 4 through the automatic transmission 5. When a large output is required, the clutch 3 is connected and the vehicle is driven by the output of both the engine 2 and the electrical rotation element 4 or by the engine 2 alone. When the vehicle is driven only by the output of the electrical rotation element 4, the electrical rotation element 1 is driven by the engine 2 and generates electricity. During braking, the clutch 3 is disconnected and the electrical rotation element 4 is driven by the inertia of the vehicle to generate electrical energy by regeneration.

The present invention relates to controlling, on the basis of operational conditions, oil pressure (line pressure) supplied from an oil pump 16 due to an oil pressure drive mechanism in an automatic transmission 5 (for example a continuously variable transmission) used in the above type of vehicle. In particular, the invention relates to reducing a line pressure below a minimum value during conditions where the vehicle is stationary with the brake depressed. Thus driving energy for the electrical motor 17 which drives the oil pump 16 and pump noise can be reduced.

The invention will be explained in detail below.

Figure 2:
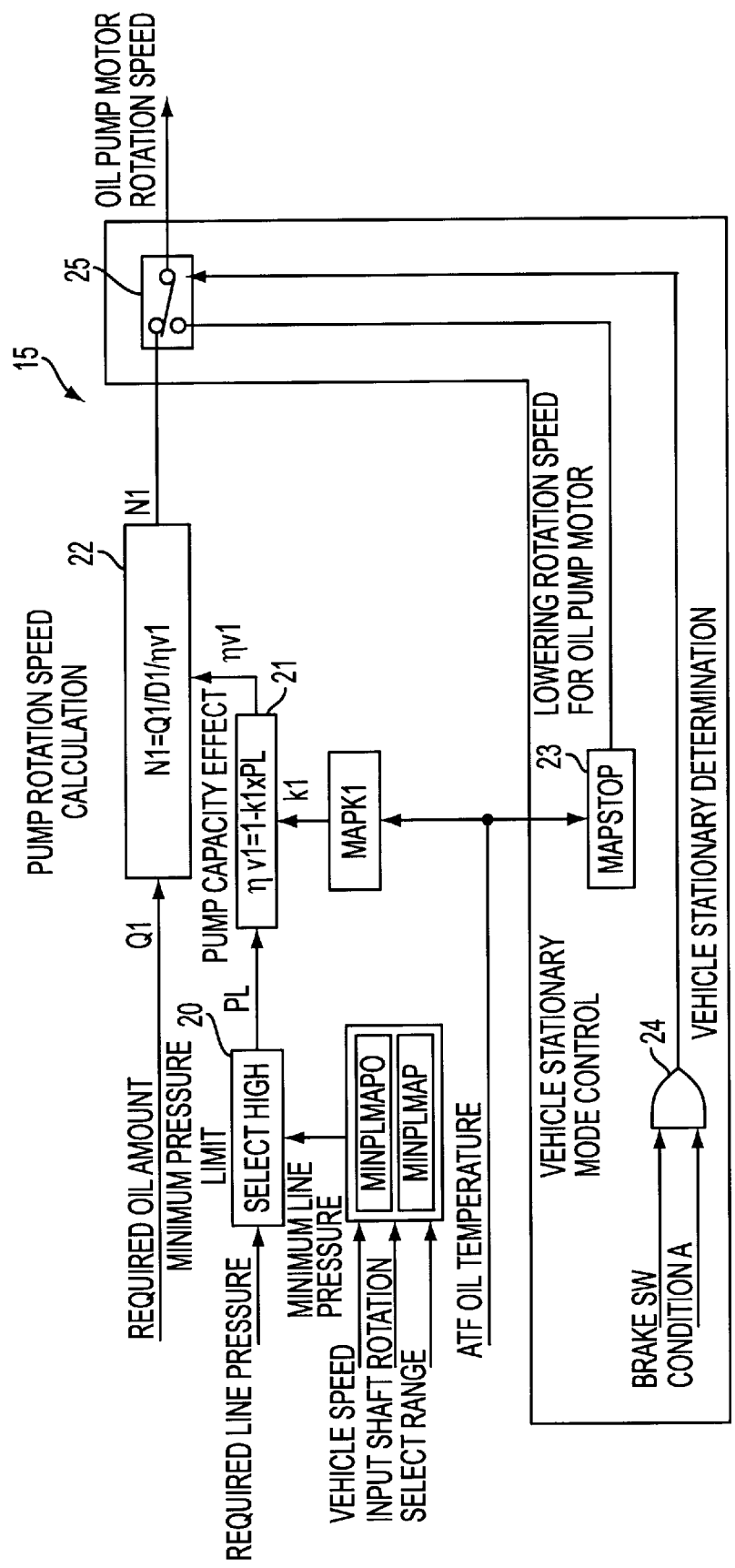
FIG. 2 is a block diagram of a device for controlling a pump rotation speed.

Firstly, FIG. 2 shows a control device 15 which regulates an oil pressure which is supplied to an oil pressure control mechanism in an automatic transmission. In the drawing, 20 is a selecting circuit which selects and indicates the higher voltage of a necessary line pressure and a minimum line pressure. The required line pressure is determined on the basis of the current vehicle speed, input rotation speed, selected range and the like. Furthermore the minimum line pressure is determined from the response characteristics of the oil pressure and the characteristics of the transmission. Normally it is not possible to achieve a line pressure lower than the minimum line pressure.

The selecting circuit 20 selects a line pressure PL which is the higher of the two. 21 is an addition circuit for the effective capacity of the pump. The effective capacity of the pump ηv1 is calculated from a coefficient k1 based on the oil temperature ATF of the automatic transmission and a line pressure PL by the equation $\mu v1=1-k1\times PL$.

22 is a first pump rotation speed calculation circuit which calculates a pump rotation speed N1 from the current required flow amount Q1, the effective capacity of the pump ηv1 and the pump fixed emission mount D1 by the equation N1=Q1/D1/ηv1.

Figure 3:
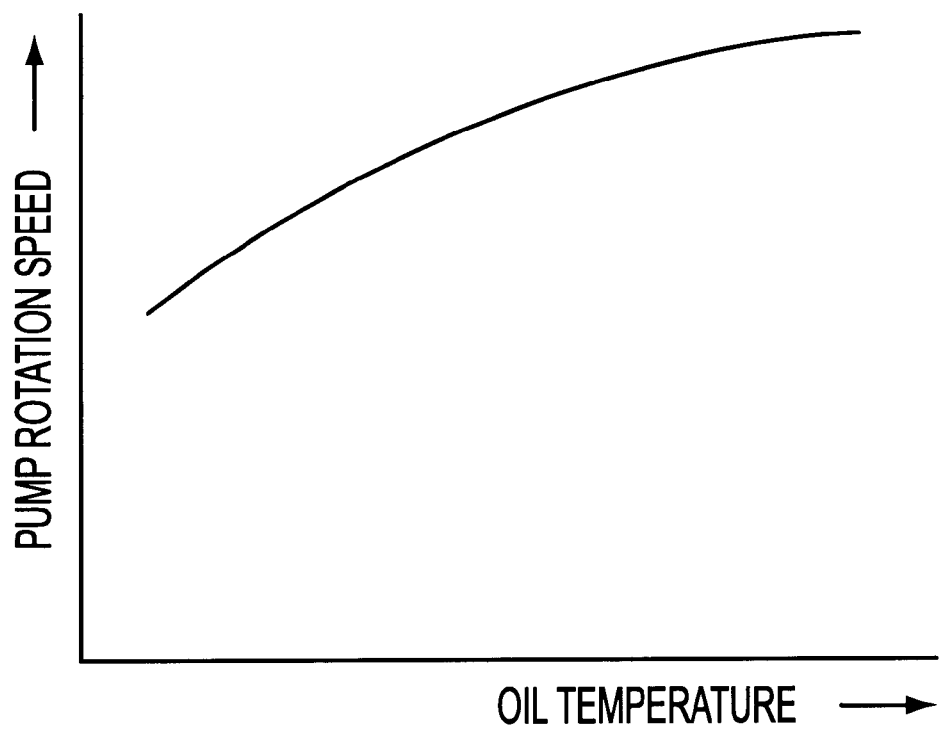
FIG. 3 is a diagram of correction characteristics for rotation speed depending on oil temperature.

23 is a second pump rotation speed calculation circuit which calculates pump rotation speed N2 which is lower than N1 as a target rotation speed in order to further lower a pump rotation speed in a driving region such as when the vehicle is stationary under the control of the brake in which a line pressure may be lowered below a minimum line pressure. The rotation speed N2 is corrected by characteristics such as those shown in FIG. 3 in response to the oil temperature ATF. That is to say, a pump leakage amount is increased as the oil temperature increases and since the line pressure decreases, the rotation speed N2 rises as the oil temperature increases.

24 is a determination circuit for vehicle stationary mode (stationary vehicle condition) which determines a stationary vehicle condition when a brake signal from the brake switch SW and a stationary vehicle condition signal A are input. As a result, the operation of the selecting circuit 25 is switched. In this way, instead of the output from the first pump rotation speed calculation circuit 22, the selecting circuit 25 outputs the output of the second pump rotation speed calculation circuit 23 as an oil pump rotation speed signal to the pump drive circuit (not shown).

In this example, the oil pump is driven by an electrical motor. Thus the rotation speed of the electrical motor is controlled to equal an oil pump rotation speed which has been set as a target.

Figure 4:
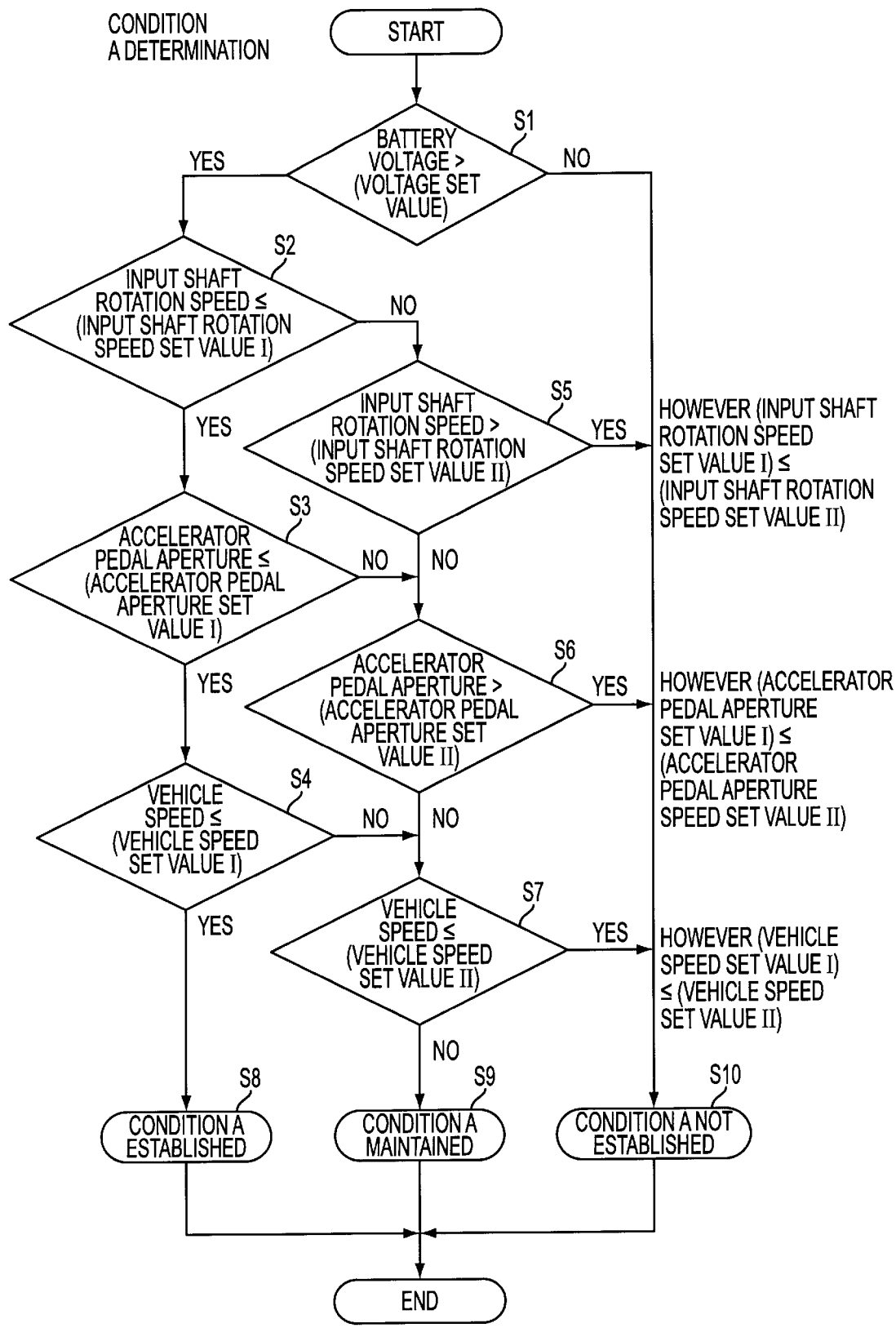
FIG. 4 is a flowchart for determining whether the vehicle is stationary.

The stationary vehicle condition signal A which is input into the stationary vehicle mode determination circuit 24 is calculated by the determination operation as shown in the flowchart in FIG. 4.

Firstly, in a step S1, a battery voltage is compared with a set voltage. When the battery voltage is normally above a set value, the routine proceeds to a the values in step 2. When the voltage is below a respective set value, since control of the line pressure control solenoid and the control of the electrical motor for driving the oil pump are reduced, the routine proceeds to a step S10.

When the battery voltage is above a set value, firstly in a step S2, it is determined whether an input shaft rotation speed of the transmission (engine rotation speed) is smaller than a rotation speed set value I. When the input shaft rotation speed is smaller, in a step S3, it is determined whether the accelerator pedal aperture is smaller than an aperture set value I. In the same way, when the accelerator pedal aperture is smaller, in a step S4, it is determined whether or not the vehicle speed is smaller than a vehicle speed set value I. When the vehicle speed is smaller, in a step S8, it is determined that the stationary vehicle conditions have been established.

That is to say, it is determined that the stationary vehicle conditions have been established when the input shaft rotation speed, the accelerator aperture, and the vehicle speed all have a value which is lower than a set value I.

In contrast, when the values in steps S2–S4 are respectively above the set value, the routine respectively proceeds to respective steps S5–S7 and compares the respective values with a second value II. That is to say, when the input shaft rotation speed is larger than a set value I, it is determined in a step S5, whether or not the value is larger that a second set value II. If it is larger, it is determined that the stationary vehicle condition is not established and the routine proceeds to a step S10. The set value II of the rotation speed is set to a larger value than the set value I. (thereafter the routine is the same).

When the input shaft rotation speed is smaller than the set value II, the routine proceeds to a step S6 and the aperture of the accelerator pedal is compared to the second aperture value II. In the step 3, when the accelerator pedal aperture is larger than the set value I, the value is compared with the set value II. When smaller than the set value, the routine proceeds to a step S7, where the vehicle speed is compared with a second vehicle speed set value II. When the vehicle speed is larger than the set value I in the step S4, in the same way, the value is compared with the set value II. When the vehicle speed is smaller than the second set value II, in a step 9, it is determined that the stationary vehicle condition A has been maintained.

That is to say, when compared with the establishment conditions of the stationary vehicle conditions, the set values of the input shaft rotation speed, accelerator aperture, and the vehicle speed are respectively compared to a larger second condition. If lower than the second condition, it is determined that the stationary vehicle condition has been continuously maintained.

When any of step S5 to step S7 are larger than a set value II, the stationary vehicle condition is determined not to be established in a step The overall operation of the above structure will be explained below.

During normal vehicle operating conditions, that is to say, when the vehicle is not in the stationary vehicle mode, the rotation speed of the oil pump is maintained at a pump rotation speed N1. In this way an oil amount which is necessary at that time is maintained at the higher pressure of the required line pressure and the minimum line pressure.

On the other hand, when the stationary vehicle conditions are realized, that is to say when the brake pedal is depressed, the pump rotation speed is switched to a second rotation speed N2 which is lower than the rotation speed N1 when any of the transmission input shaft rotation speed, the accelerator pedal aperture and the vehicle speed are lower than a set value during vehicle operation.

The line pressure during normal vehicle operation is the necessary pressure to perform speed ratio control with a fixed responsiveness. In contrast, when the vehicle is stationary with the brake pedal depressed, speed ratio control is not performed and the subsequent variation is not executed immediately since the brake is depressed. Thus there is no necessity to increase the line pressure in expectation of speed ratio control and the line pressure may be lower than the minimum line pressure during normal operation.

Thus at such times, it is possible to further lower the pump rotation speed in order to reduce the drive force which drives the oil pump. In addition, noise pollution may be reduced by the reductions in pump operation noise.

However even when the vehicle is stationary, when the driver's foot is released from the brake pedal or the accelerator pedal is depressed, the stationary vehicle mode is cancelled in consideration of the delay in the creation of a line pressure to prepare for the next driving operation (speed ratio control). The pump rotation speed is returned to a normal rotation speed N1 from N2 and at least a minimum line pressure is maintained.

However the pump rotation speed N2 in stationary vehicle mode is corrected in response to a current oil temperature. The rotation speed is regulated to undergo relative increases in response to increases in oil temperature. This is in order to guarantee a line pressure supplied by correcting a rotation speed in response to oil temperature since the pump leakage amount increases with rises in oil temperature. Furthermore it prevents the line pressure from reducing more than is necessary.

In this way, the present invention reduces a pump rotation speed when a pump rotation speed for controlling oil pressure in an automatic transmission is lower than a necessary line pressure during normal operation such as when the brake pedal is depressed and the vehicle is stationary. Pump drive force and drive noise are reduced. In particular, a type of vehicle which drives an oil pump with an electric motor can smoothly deal with generated noise and drive energy.

The present invention is not limited to a hybrid vehicle and may be adapted to control an oil pump of an automatic transmission of a vehicle which runs on a normal engine.

The entire contents of Japanese Patent Application P10-184079 (filed Jun. 30, 1998) is incorporated herein by reference. Although the invention has been described above by reference to certain embodiments of the invention, the invention is not limited to the embodiments described above. Modifications and variations of the embodiments described above will occur to those skilled in the art, in light of the above teaching.

The scope of the invention is defined with reference to the following claims.

What is claimed is:

1. An oil pump control device for an automatic transmission controlled by a speed ratio control mechanism in response to an oil pressure, said oil pump control device comprising:
    an oil pump supplying an oil pressure to an oil pressure control mechanism of said automatic transmission; and
    an oil pump controller controlling a rotation speed of said oil pump wherein said oil pump controller further comprises
    a circuit setting a rotation speed of said oil pump rotation speed to maintain at least a minimum required oil pressure to control said automatic transmission,
    a stationary vehicle determination circuit determining a condition that a vehicle is braking and a vehicle speed is below a set vehicle speed value,
    a circuit determining a second pump rotation speed lower than said first pump rotation speed when said stationary vehicle condition is established, and
    a circuit controlling a pump rotation speed to equal said set pump rotation speeds.

2. An oil pump control device for an automatic transmission according to claim 1 wherein each said set rotation speed is corrected in response to an oil temperature.

3. An oil pump control device for an automatic transmission according to claim 1 wherein said oil pump is rotatably driven by an electrical motor and said control circuit controls a rotation speed of said electrical motor to maintain each said set pump rotation speed.

4. An oil pump control device for an automatic transmission controlled by a speed ratio control mechanism in response to an oil pressure, said oil pump control device comprising:
    an oil pump supplying an oil pressure to an oil pressure control mechanism of said automatic transmission;
    means for setting a rotation speed of said oil pump to a first pump rotation speed to maintain at least a minimum required oil pressure to control said automatic transmissions;
    stationary vehicle determination means for determining a condition that a vehicle is braking and a vehicle speed is below a set vehicle speed value;
    means for determining a second pump rotation speed lower than said first pump rotation speed when said stationary vehicle condition is established; and
    means for controlling a pump rotation speed to equal said set pump rotation speeds.

5. An oil pump control device for an automatic transmission controlled by a speed ratio control mechanism in response to an oil pressure, said oil pump control device comprising:
    an oil pump supplying an oil pressure to an oil pressure control mechanism of said automatic transmission;
    a circuit setting a rotation speed of said oil pump to a first pump rotation speed to maintain at least a minimum required oil pressure to control said automatic transmission;
    a stationary vehicle determination circuit determining a condition that a vehicle is braking and a vehicle speed is below a set vehicle speed value;
    a circuit determining a second pump rotation speed lower than said first pump rotation speed when said stationary vehicle condition is established; and
    a circuit controlling a pump rotation speed to equal said set pump rotation speeds.

* * * * *